United States Patent
Ban

(10) Patent No.: US 7,415,964 B2
(45) Date of Patent: Aug. 26, 2008

(54) FUEL INJECTION CONTROL APPARATUS DESIGNED TO MINIMIZE COMBUSTION NOISE OF ENGINE

(75) Inventor: Mitsuru Ban, Okazaki (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/785,050

(22) Filed: Apr. 13, 2007

(65) Prior Publication Data
US 2007/0240675 A1    Oct. 18, 2007

(30) Foreign Application Priority Data
Apr. 13, 2006    (JP)    ............... 2006-110462

(51) Int. Cl.
*F02B 3/00* (2006.01)
*F02M 1/00* (2006.01)

(52) U.S. Cl. ..................... 123/299; 123/447

(58) Field of Classification Search ........... 123/299, 123/447, 456, 478, 480, 490
See application file for complete search history.

(56) References Cited

U.S. PATENT DOCUMENTS

| 4,058,709 A | * | 11/1977 | Long ............... 701/105 |
| 4,724,816 A | * | 2/1988 | Kanno et al. ............ 123/491 |
| 6,363,315 B1 | | 3/2002 | Love et al. |
| 2003/0106531 A1 | * | 6/2003 | Saeki et al. ............ 123/435 |
| 2004/0103647 A1 | * | 6/2004 | Yomogida et al. .......... 60/284 |
| 2005/0081825 A1 | * | 4/2005 | Suenaga et al. ........... 123/446 |

FOREIGN PATENT DOCUMENTS

| JP | 05-195848 | 8/1993 |
| JP | 05-195848 A | 8/1993 |
| JP | 09-126044 | 5/1997 |

* cited by examiner

Primary Examiner—John T Kwon
(74) Attorney, Agent, or Firm—Nixon & Vanderhye PC

(57) ABSTRACT

A fuel injection control apparatus for a diesel engine is provided which works to determine the number of a sequence of injection events to inject fuel into the engine in each operating cycle of the engine and increase it based on the temperature of an injector drive circuit. When the temperature of the injector drive circuit is relatively low, the apparatus increases the number of injection events to decrease the degree of combustion in the engine, thereby reducing the combustion noise of the engine.

9 Claims, 5 Drawing Sheets

FUEL INJECTION CONTROL APPARATUS DESIGNED TO MINIMIZE COMBUSTION NOISE OF ENGINE

CROSS REFERENCE TO RELATED DOCUMENT

The present application claims the benefit of Japanese Patent Application No. 2006-110462 filed on Apr. 13, 2006, the disclosure of which is totally incorporated herein by reference.

BACKGROUND OF THE INVENTION

1. Technical Field of the Invention

The present invention relates generally to a fuel injection control apparatus, such as a common rail system for automotive diesel engines, which is designed to inject fuel into a cylinder of an internal combustion engine through a sequence of multiple injection events in each operating cycle of the engine, and more particularly, to such an apparatus deigned to increase the number of injection events to minimize a combustion noise of the engine.

2. Background Art

Typical diesel engines for automotive vehicles to required not only to meet tightened exhaust regulations, but also to reduce noise arising from combustion of the engine which is usually higher than that in gasoline engines. The reduction in noise is proposed to be achieved using a multi-injection strategy in which a sequence of multiple injection events are performed in each operating cycle of the engine (i.e., a four-stroke cycle) including intake or induction, compression, combustion, and exhaust. Specifically, the more the number of injection events, the smaller will be the amount of fuel sprayed in each of the injection events, thus resulting in a decrease in the degree of combustion to reduce the combustion noise. For example, Japanese Patent First Publication No. 5-195848 teaches such a technique. Consequently, it is preferable to increase the number of injection events in each operating cycle of the engine as many as possible.

To achieve the multi-injections, fuel injection systems are usually employed which are designed to store the fuel in an accumulator or common rail under high pressure and spray the fuel, as stored in the common rail, into the engine through injectors. Such a type of fuel injection system is equipped with an injector drive circuit which works to energize or open each of the injectors in accordance with an injection pattern defining a fuel injection mode. Specifically, the injector drive circuit is equipped with a capacitor and an electrical charger. When it is required to initiate the injection of fuel into the engine, the injector driver circuit release electrical energy, as stored in the capacitor by the capacitor charger, to open each of the injectors quickly to achieve the fuel injection mode, as defined by the injection pattern.

The injector drive circuit is, however, usually elevated in temperature due to cyclic execution of the fuel injections. Specifically, when the capacitor is discharged or charged, a large current will flow in the injector drive circuit, so that it generates a large amount of heat and increases the temperature of the injector drive circuit. In order to avoid a reduction in performance of the injector drive circuit arising from a rise in temperature thereof, the number of injections to be executed in each operating cycle of the engine needs to be limited.

SUMMARY OF THE INVENTION

It is therefore a principal object of the invention to avoid the disadvantages of the prior art.

It is another object of the invention to provide a fuel injection control apparatus designed to increase the number of injections of fuel into an engine in each operating cycle of the engine based on the temperature of an injector drive circuit to reduce the combustion noise of the engine.

According to one aspect of the invention, there is provided a fuel injection control apparatus which may be employed in automotive common rail diesel engines. The fuel injection control apparatus for a diesel engine comprises: (a) an accumulator in which fuel is stored at a controlled pressure; (b) an electrically energized injector working to inject the fuel, as stored in the accumulator, into a diesel engine; (c) an injector drive circuit working to control energization of the injector; and (d) a controller working to determine a multi-injection mode in which the fuel is to be injected from the injector into the diesel engine in a sequence of multiple injections in an operating cycle of the diesel engine and output an injection signal to the injector drive circuit to perform the multi-injection mode through the injector. The controller determines whether the number of injections to be executed in a subsequent operating cycle of the diesel engine is allowed to be increased or not in a range which ensures stability of operation of the diesel engine based on the temperature of the injector drive circuit. When it is determined that the number of injections is allowed to be increased, the controller increases the number of injections to be executed in the subsequent operating cycle of the engine. This results in a decrease in quantity of fuel to be sprayed in each of the injections without increasing the temperature of the injector drive circuit undesirably, which leads to a reduction in combustion noise of the engine.

In the preferred mode of the invention, the controller is designed to perform a temperature determining function to determine the temperature of the injector drive circuit. The controller may calculate the temperature of the injector drive circuit mathematically or use an output of a temperature sensor to measure the temperature of the injector drive circuit directly.

When it is determined that the number of injections is allowed to be increased, the controller determines the number of injections to be executed in the subsequent operating cycle of the engine as a function of the temperature of the injector drive circuit.

The controller stores a plurality of multi-injection patterns which define multi-injection modes different from each other in terms of the temperature of the injector drive circuit and selects one of the multi-injection patterns which matches the temperature of the injector drive circuit.

When the diesel engine is at least in a range in which the diesel engine is low in speed thereof and load thereon, the number of injections to be executed in the subsequent operating cycle of the diesel engine is allowed to be increased.

When it is determined that the number of injections to be executed in the subsequent operating cycle of the diesel engine is not allowed to be increased, the controller may decrease the number of injections to be executed in the subsequent operating cycle of the diesel engine.

After execution of the multi-injection mode, the controller may determine whether the diesel engine is in an instable operating condition or not. When it is determined that the diesel engine is in the instable operating condition, the controller may decrease or prohibit the number of injections to be executed in the subsequent operating cycle of the diesel engine from being increased.

The injector drive circuit includes a valve-opening current supply circuit equipped with a capacitor and a valve position-holding current supply circuit. When it is required to open the injector, the valve-opening current supply circuit works to release electrical energy from the capacitor to supply a valve opening current to the injector. The valve position-holding current supply circuit works to supply a valve position-holding current after supply of the valve opening current to hold the injector at a given valve position. The controller decreases charge-up voltage for charging the capacitor of the valve-opening current supply circuit within a range which ensures the stability of operation of the diesel engine. This results in a decrease in amount of heat arising from charging and discharging of the capacitor, thus allowing the number of injections to be increased further, which leads to a further reduction in the combustion noise of the engine.

The controller may sample a given heat parameter that is a function of a heat balance in the injector drive circuit and use the heat parameter to determine, the temperature of the injector drive circuit.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
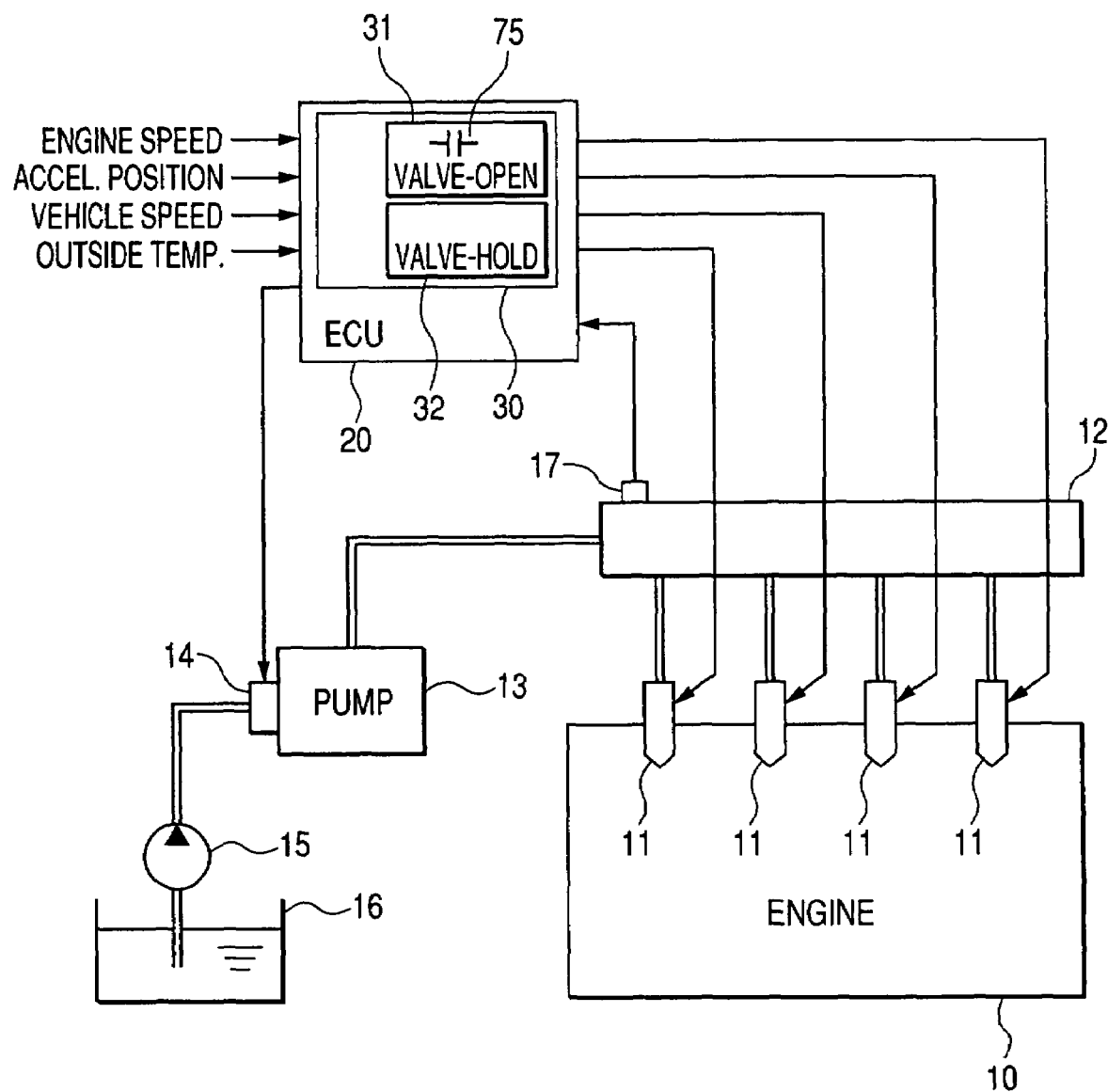
FIG. 1 is a block diagram which shows a fuel injection control apparatus engineered as a common rail injection system according to the invention.

Referring to the drawings, wherein like reference numbers refer to like parts in several views, particularly to FIG. 1, there is shown a fuel injection control apparatus engineered as a common rail injection system according to the first embodiment of the invention which is designed for a multi-cylinder diesel engine to be mounted in automotive vehicles.

The common rail injection system includes solenoid-operated fuel injectors 11 one for each cylinder of a four-cylinder diesel engine 10, a common rail 12, a high-pressure pump 13, a suction control pump 14, a feed pump 15, a fuel pressure sensor 17, and an electronic control unit (ECU) 20. The fuel injectors 11 are each connected to the common rail 12. The high-pressure fuel pump 13 is connected to the common rail 12 and equipped with the suction control valve 14. The suction control valve 14 is connected to a fuel tank 16 through the feed pump 15. The feed pump 15 works to pump fuel out of the fuel tank 16 and feed it to the suction control valve 14. The suction control valve 14 works to control the amount of fuel to be sucked to the high-pressure fuel pump 13. The high-pressure fuel pump 13 works to pressurize the sucked fuel and supply it to the common rail 12 in which the fuel is stored at a controlled high pressure level. The fuel pressure sensor 17 is installed in the common rail 12 to measure the pressure of the fuel within the common rail 12 and output a signal indicative thereof to the ECU 20.

The ECU 20 is made up of a typical microcomputer equipped with a CPU, a ROM, a RAM, etc. The ECU 20 monitors at all times, as parameters indicating operating conditions of the engine 1, sensor outputs indicating the speed of the engine 10, a driver's effort or position of an accelerator pedal, the speed of the vehicle, and the ambient temperature of air as well as the output from the fuel pressure sensor 17. The ECU 20 works to execute control programs, as stored in the ROM, to calculate controlled variables using the monitored operating conditions of the engine 1 for fuel injection control.

The ECU 20 is also equipped with an injector drive circuit 30 which is responsive to a fuel injection signal, as produced by the ECU 20, to energize each of the fuel injectors 11. The injector drive circuit 30 includes a valve-opening current supply circuit 31 and a valve position-holding current supply circuit 32. The valve-opening current supply circuit 31 is designed to output a greater valve-opening current (i.e., a peak current) required to open each of the fuel injectors 11 quickly at an initial stage of operation of the fuel injectors 11. The valve position-holding current supply circuit 32 is designed to output a constant position-holding current to hold each of the fuel injectors 11 at a selected valve position following the initial stage of operation of the fuel injectors 11. The valve-opening current supply circuit 31 includes a capacitor 75 and a capacitor charger (not shown). The capacitor 75 works to store electrical energy and discharge it to supply the valve-opening current to a selected one of the fuel injectors 11 when it is required to open the one of the fuel injectors 11. The capacitor charger works to charge the capacitor 75 up to a preselected voltage level (e.g., 80V).

Figure 2:
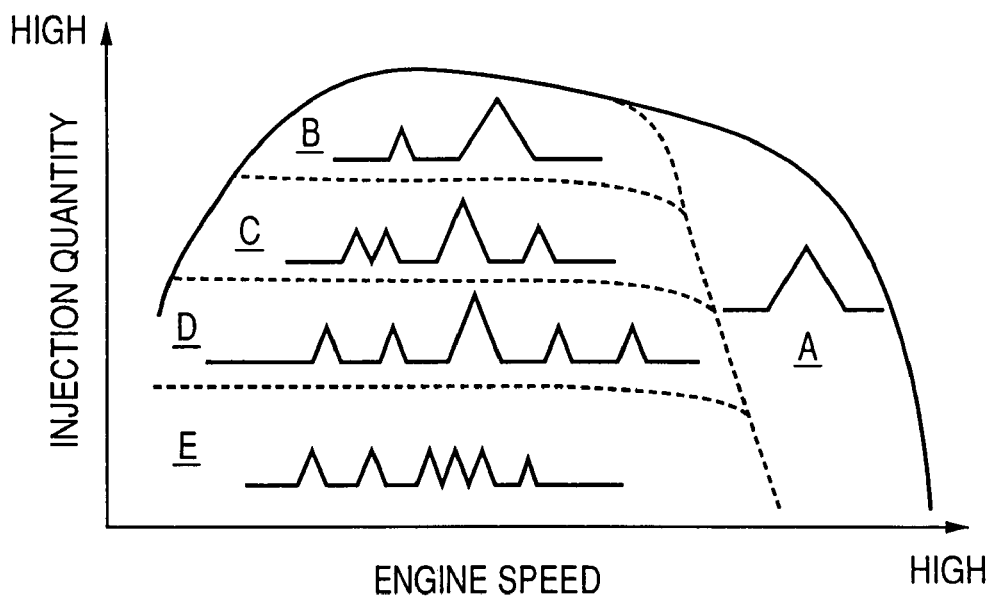
FIG. 2 is a view which shows injection patterns each of which is defined in one of engine operating ranges, as specified by the speed of an engine and the quantity of fuel injected.

Upon initiation of the fuel injection control, the ECU 20 calculates the quantity of fuel to be injected into the engine 10 and selects one of injection patterns which specifies combinations of the number of injections per operating cycle of the engine 10 (i.e., a four-stroke cycle) including intake or induction, compression, combustion, and exhaust, the injection timing, and the rate of injection of fuel. FIG. 2 demonstrates such injection patterns each of which is defined in one of engine operating ranges A, B, C, D, and E, as specified by the speed of the engine 10 and the injection quantity. Specifically, when the speed of the engine 10 is high, the ECU 20 selects the engine operating range A and opens each of the fuel injectors 11 one time in each operating cycle of the engine 10.

When the speed of the engine 10 is low or middle, the ECU 20 selects one of the engine operating ranges B, C, D, and E and opens each of the fuel injectors 11 two to five times in each operating cycle of the engine 10 depending upon a required quantity of fuel to be injected into the engine 10. Such multiple injections of fuel into the engine 10 in each engine operating cycle will result in improved quantity of exhaust emissions from the engine 10 or reduction in combustion noise of the engine 10.

Usually, the greater the number of injection events in each engine operating cycle, the smaller the quantity of fuel sprayed in one or some of the injection events may be set, thus resulting in reduction in combustion noise of the engine 10. From the viewpoint of such noise reduction, it is, therefore, advisable that the number of injection events per engine operating cycle be increased as many as possible. However, the number of injection events is usually determined to be smaller than a given value. This is because when the valve-opening current supply circuit 31 discharges the capacitor 75, it will cause the large current to be released, generating a large amount of heat. Specifically, the amount of heat, as dissipated by the valve-opening current supply circuit 31, increases with an increase in number of injection events, thus resulting in an elevation in temperature of the injector drive circuit 30, which may lead to an error in controlling the fuel injectors 11. Accordingly, the number of injection events in each operating cycle of the engine 10 should be selected to be smaller than or equal to the value which ensures the stability of operation of the fuel injectors 11 in the worst conditions.

However, when the temperature of the injector drive circuit 30 is low in usual use, it is possible to increase the number of injection events more than the above upper limit value. The ECU 20 is, thus, designed to monitor or determine the temperature of the injector drive circuit 30 and increase the number of injection events in a subsequent operating cycle of the engine 10 when the monitored temperature is lower than a given value.

To determine the temperature of the injector drive circuit 30, the ECU 20 monitors a heat balance in the injector drive circuit 30. Specifically, a change in temperature of the injector drive circuit 30 may be found as a function of a difference between the amount of heat, as generated in the injector drive circuit 30, and the amount of heat, as dissipated from the injector drive circuit 30 (i.e., the heat balance). The ECU 20 monitors such a heat balance to determine the temperature of the injector drive circuit 30. Specifically, the ECU 20 first determines the amount of heat arising from charging of the capacitor 75 of the valve-opening current supply circuit 31 based on the speed of the engine 10, the number of injection events executed, and the charge-up voltage for the capacitor 75 of the valve-opening current supply circuit 31 and the amount of heat arising from outputting of the valve-opening current and the position-holding current to the fuel injectors 11 based on the quantity of fuel injected into the engine 10 (or the injection duration) and defines the sum of them as the amount of heat generated in the injector drive circuit 30. The ECU 20 also determines the amount of heat transferred to a mount of the injector drive circuit 30 and the amount of heat emitted to air based on the speed of the vehicle and the ambient temperature and defines the sum of them as the amount of heat dissipated from the injector drive circuit 30. The ECU 20 calculates a difference between the amounts of heat generated in and dissipated from the injector drive circuit 30 per unit time as the heat balance and add it to an initial value that is a function of an initial value of the temperature of the injector drive circuit 30 to determine the temperature of the injector drive circuit 30 in a cycle. The initial value of the temperature of the injector drive circuit 30 is set to, for example, the temperature of outside air upon start-up of the engine 10 (i.e., turning on of an ignition switch for the engine 10).

Figure 3A:
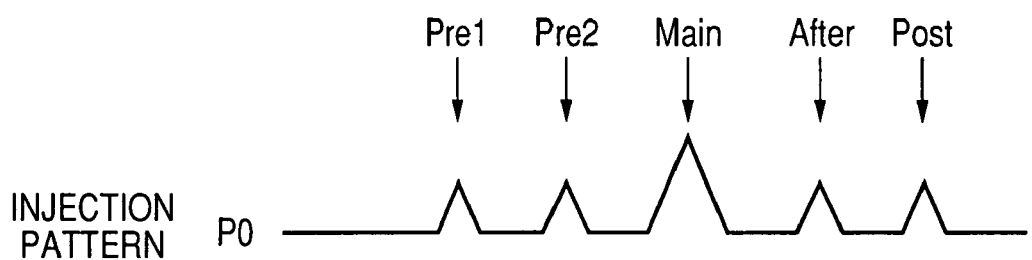
FIG. 3(a) demonstrates an injection pattern before the number of injections is increased.
Figure 3B:
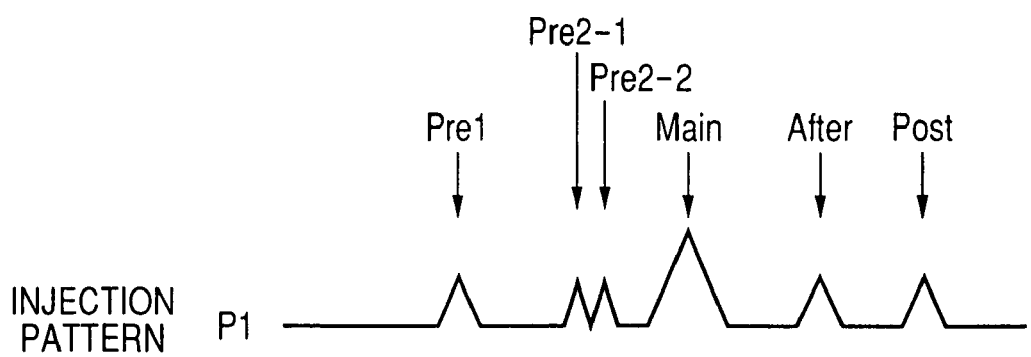
FIG. 3(b) demonstrates an injection pattern after the number of injections is increased.

How to increase the number of injection events in a subsequent operating cycle of the engine 10 will be described below with reference to FIGS. 3($a$) and 3($b$). FIG. 3($a$) demonstrates an injection pattern $P_0$ in the engine operating range D, as illustrated in FIG. 2. FIG. 3($b$) demonstrates an injection pattern $P_1$ in which one injection event is added to the injection pattern $P_0$. Specifically, the injection pattern $P_0$ includes five injection events: a first and a second pre-injection $Pre_1$ and Pre2, a main injection Main, an after-injection After, and a post injection Post, while the injection pattern $P_1$ includes six injection events where the second pre-injection $Pre_2$ is made up of a first sub pre-injection $Pre_{2-1}$ and a second sub pre-injection $Pre_{2-2}$. The sum of quantities of fuel to be injected in events of the first and second sub pre-injection $Pre_{2-1}$ and $Pre_{2-2}$ may be equal to the quantity of fuel to be injected in an event of the second pre-injection Pre2. In this way, the ECU 20 works to increase the number of injection events in one operating cycle of the engine 10 without changing a total quantity of fuel to be injected in order to reduce the combustion noise of the engine 10.

In the injection pattern $P_0$, as illustrated in FIG. 3($a$), the post injection Post serves to regenerate an exhaust emission control device, not to contribute to production of the engine torque. Therefore, the increasing of the number of injection events is achieved by dividing any of the first pre-injection $Pre_1$, the second pre-injection Pre2, the main injection Main and the after-injection After into a plurality of sub-injections. Since it is usually difficult to re-calculate a ratio among the quantities of fuel to be injected in a sequence of the injections in each operating cycle of the engine 10 and injection timings thereof, the ECU 20 is designed to store injection patterns which are predefined on the basis of an increment of the number of injection events and selects one of them as required.

Figure 4:
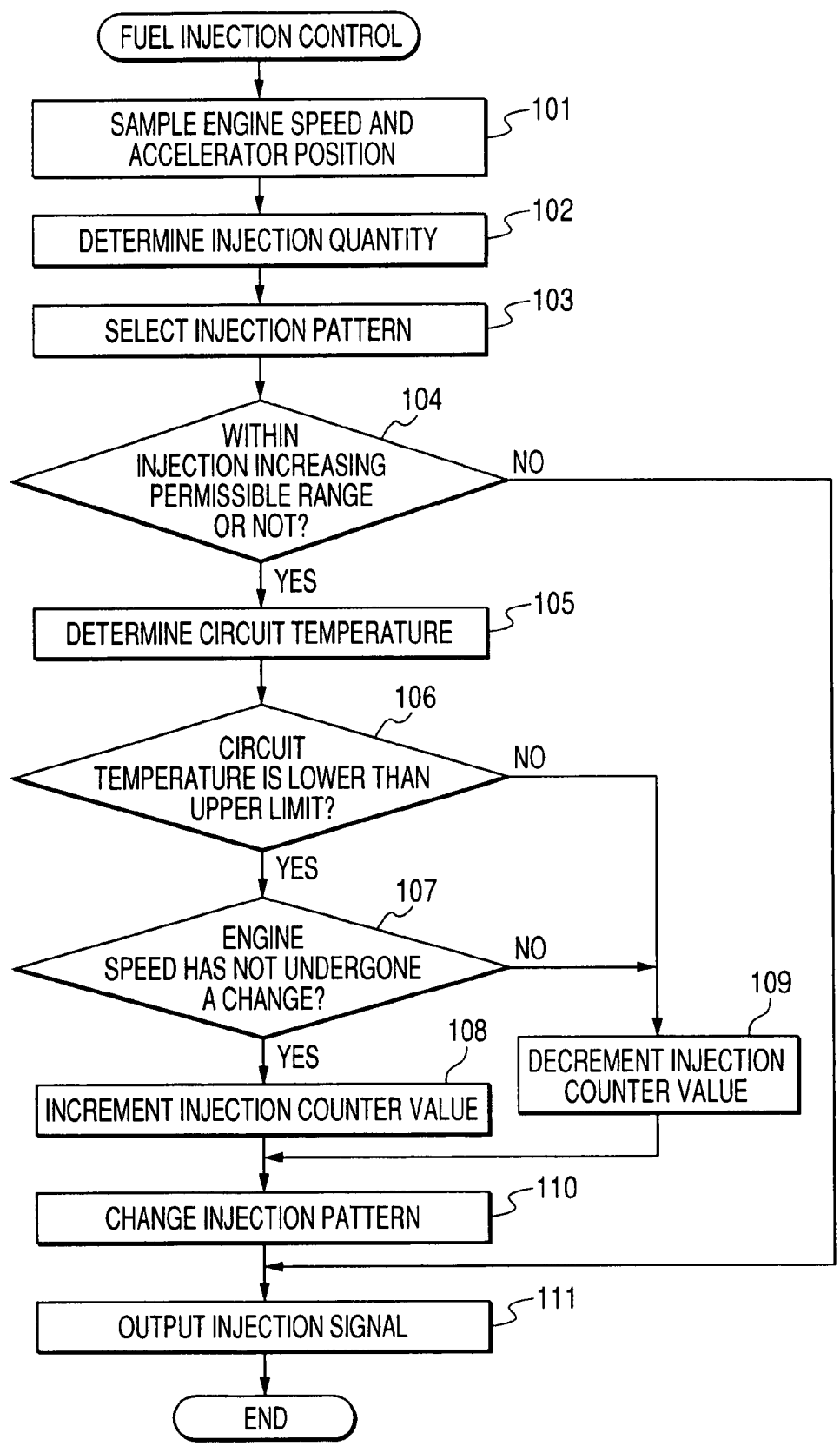
FIG. 4 is a flowchart of a fuel injection control program to be executed in the fuel injection control apparatus of FIG. 1 to change the number of injections in an operating cycle of an engine.

FIG. 4 is a flowchart of a sequence of logical steps or program to be executed by the ECU 20 at an interval of given crank angles (i.e., upon request of execution of the fuel injection) to increase the number of injection events when the temperature of the injector drive circuit 30 is low.

After entering the program, the routine proceeds to step 101 wherein the speed of the engine 10 and the position of the accelerator pedal are sampled. The routine proceeds to step 102 wherein the quantity of fuel to be injected into the engine 10 (i.e., a target injection quantity) is determined as a function of the position of the accelerator pedal, as sampled in step 101. The routine proceeds to step 103 wherein one of injection patterns, as listed in an injection pattern map like the one of FIG. 2, is selected based on the speed of the engine 10 and the target injection quantity, as determined in step 102.

Figure 5:
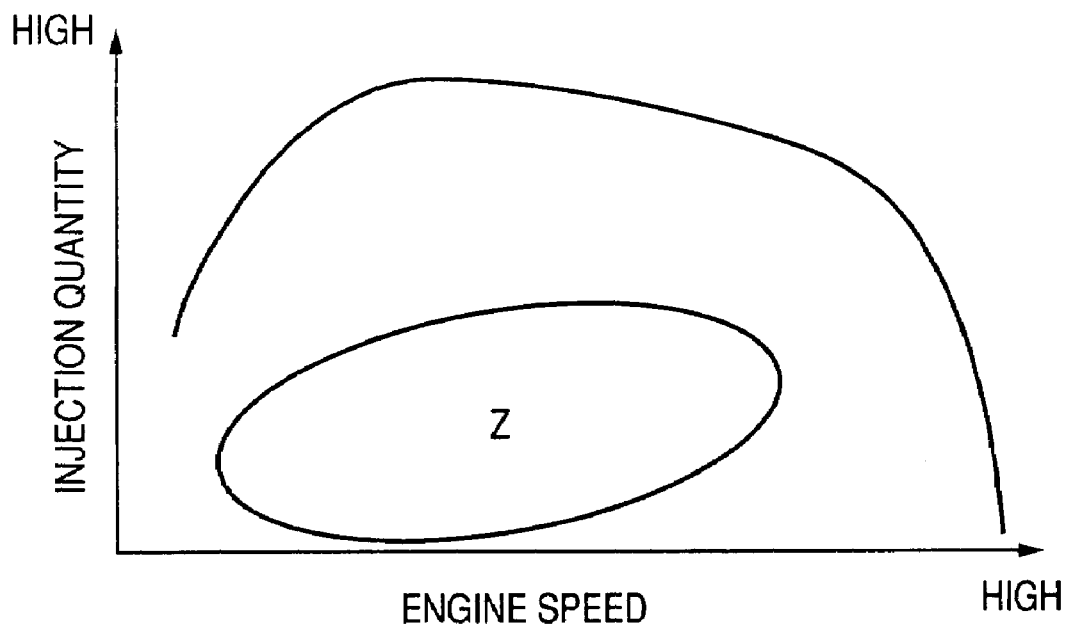
FIG. 5 is a view which shows an injection increasing permissible range Z in which both the speed of an engine and the quantity of fuel to be injected into the engine are lower and which permits the number of injection events in each operating cycle of the engine to be increased.

The routine proceeds to step 104 wherein it is determined whether the current operating condition of the engine 10, as defined by the speed of the engine 10 and the target injection quantity, lies within an injection increasing permissible range Z or not. The injection increasing permissible range Z is, as illustrated in FIG. 5, a range in which both the speed of the engine 10 and the quantity of fuel to be injected into the engine 10 are lower and which permits the number of injection events in a subsequent operating cycle of the engine 10 to be increased. In FIG. 5, a solid line extending outside the injection increasing permissible range Z indicates a regular engine operating range similar to the one in FIG. 2. If a YES answer is obtained in step 104 meaning that the current operating condition of the engine 10 lies within the injection increasing permissible range Z, then the routine proceeds to step 105. Alternatively, if a NO answer is obtained, then the routine proceeds directly to step 111.

In step 105, the temperature of the injector drive circuit 30 is determined. This determination is made in a sub-program, as will be described later in FIG. 6. The routine proceeds to step 106 wherein it is determined whether the temperature of the injector drive circuit 30, as determined in step 105, is lower than an injection increasing permissible upper limit or not. If a YES answer is obtained meaning that the temperature of the injector drive circuit 30 is lower than the injection increasing permissible upper limit, then the routine proceeds to step 107. Alternatively, if a NO answer is obtained, then the routine proceeds to step 109.

In step 107, it is determined whether the speed of the engine 10 has not undergone an undesirable change arising from execution of the latest sequence of multiple injections or not. Specifically, an engine speed change determining program (not shown) is executed to determine whether a difference in speed of the engine 10 between before and after the execution of the latest sequence of multiple injections is greater than a given value or not. Step 107 samples the result of such a determination and determines whether the speed of the engine has changed by a undesirable amount due to the execution of the latest sequence of the multiple injections or not. Greatly increasing the number of injection events may result in a failure in actuating each of the injectors 11 according to a selected one of the injection patterns, thus leading to a undesirable variation in instant value of the speed of the engine 10 among the cylinders of the engine 10. In order to avoid such a undesirable engine speed variation, the ECU 20 determines whether the number of injection events should be increased or not. If a YES answer is obtained in step 107 meaning that the speed of the engine has not changed undesirably, then the routine proceeds to step 108 wherein an injection counter value indicating the number of injection events to be performed is incremented by one (1). Alternatively, if a NO answer is obtained in step 106 or 107, then the routine proceeds to step 109 wherein the injection counter value is decremented by one (1). Note that a minimum value of the injection counter value is set to zero (0).

After step 108 or 109, the routine proceeds to step 110 wherein one of injection patterns, as listed in an injection pattern map, is selected which matches the number of injection events, as increased or decreased in step 108 or 109.

The routine proceeds to step 111 wherein the ECU 20 outputs an injection signal, in sequence, to the injector drive circuit 30 according to the injection pattern, as selected in step 110. The routine then terminates.

Figure 6:
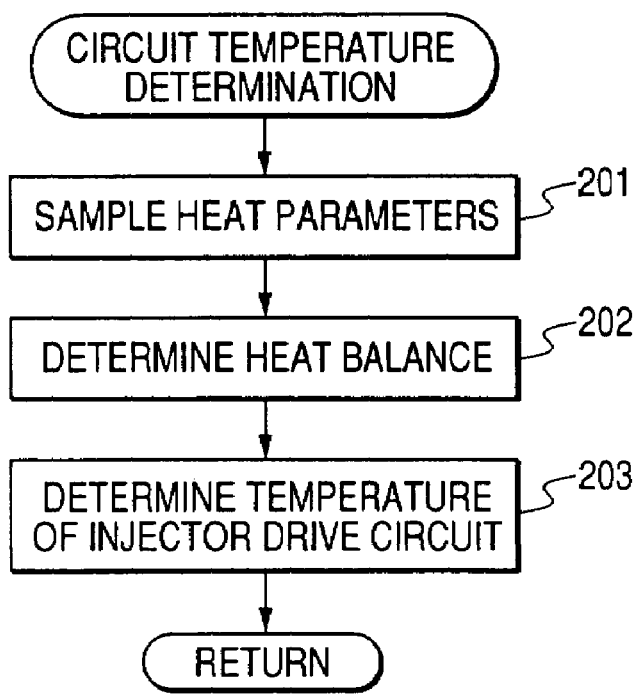
FIG. 6 is a flowchart of a circuit temperature determining program to determine the temperature of an injector drive circuit of the fuel injection control apparatus of FIG. 1.

FIG. 6 shows the circuit temperature determining program which is to be executed at a given interval in the ECU 20 to determine the temperature of the injector drive circuit 30.

First, in step 201, heat parameters required to determine the heat balance in the injector drive circuit 30 are sampled. Specifically, the number of injection events, the injection quantity (or the injection duration), the charge-p voltage, the speed of the engine 10, the speed of the vehicle, and the temperature of outside air are, as described above, sampled.

The routine proceeds to step 202 wherein the amount of heat, as generated in the injector drive circuit 30, is calculated based on the number of injection events executed, the injection quantity (or the injection duration), the charge-up voltage, and the speed of the engine 10, and the amount of heat, as dissipated from the injector drive circuit 30, is calculated based on the speed of the vehicle and the temperature of outside air. The amounts of heat, as generated in and dissipated from the injector drive circuit 30, are summed to derive the heat balance.

The routine proceeds to step 203 wherein the value of the heat balance is accumulated in a cycle to determine the temperature of the injector drive circuit 30. The ECU 20 stores it in a memory.

As apparent from the above discussion, the common rail injection system of this embodiment is designed to increase the number of injection events to be executed in a subsequent operating cycle of the engine 10 when the temperature of the injector drive circuit 30 is lower than the upper limit which ensures the stability of operation of the fuel injectors 11 in the worst conditions, thereby resulting in a decrease in combustion noise of the engine 10.

When the speed of the engine 10 has undergone an undesirable change or the temperature of the injector drive circuit 30 has become greater than the upper limit, the ECU 20 decreases the number of injection events. In other words, when it is determined that there is the possibility that the increased number of injection events may result in a failure in spraying the fuel properly, the ECU 20 decreases the number of injection events to be executed in a following operating cycle of the engine 10 to ensure the stability of operation of the engine 10.

When it is required to increase the number of injection events, the ECU 20 selects one of the injection patterns, as defined on the basis of the number of injection events to be performed, thus eliminating the need for re-calculating a ratio among the quantities of fuel to be injected in a sequence of the injections in a following operating cycle of the engine 10 and injection timings thereof.

The temperature of the injector drive circuit 30 is, as described above, determined using the heat balance between the amount of heat, as generated in the injector drive circuit 30, and the amount of heat, as dissipated from the injector drive circuit 30, thus eliminating the need for a temperature sensor, which contributes to the saving of production cost of the common rail injection system.

The combustion noise of the engine 10 is usually objectionable when the engine 10 is in low-speed and low-load conditions. The ECU 20 is, thus, designed to increase the number of injection events to be executed in a subsequent operating cycle of the engine 10 when the engine operating condition lies within the injection increasing permissible range Z in which both the speed of the engine 10 and the quantity of fuel to be injected into the engine 10 are lower, thereby resulting in an effective reduction in combustion noise of the engine 10. When the operating condition of the engine 10 is in another range where the combustion noise is not really objectionable, the ECU 20 keeps the number of injection events unchanged, thereby controlling the generation of heat in the injector drive circuit 30 to protect it thermally.

The common rail injection system according to the second embodiment of the invention will be described below which is designed to optimize the charge-up voltage for the valve-opening current supply circuit 31 of the injector drive circuit 30 to decrease the amount of heat generated in the injector drive circuit 30 in order to maximize the number of injection events in a subsequent operating cycle of the engine 10.

The charge-up voltage for the capacitor 75 of the valve-opening current supply circuit 31 is selected to be high enough to ensure the stability in opening each of the fuel injectors 11 even in the case where a variation in characteristics among solenoids of the fuel injectors 11, the resistance of harnesses leading to the fuel injectors 11, and the temperature of outside air are in the worst conditions. The ECU 20 is designed to decrease the charge-up voltage within a range which ensures the stability of operating conditions of the engine 10 to minimize the amount of heat, as generated in the injector drive circuit 30.

Figure 7:
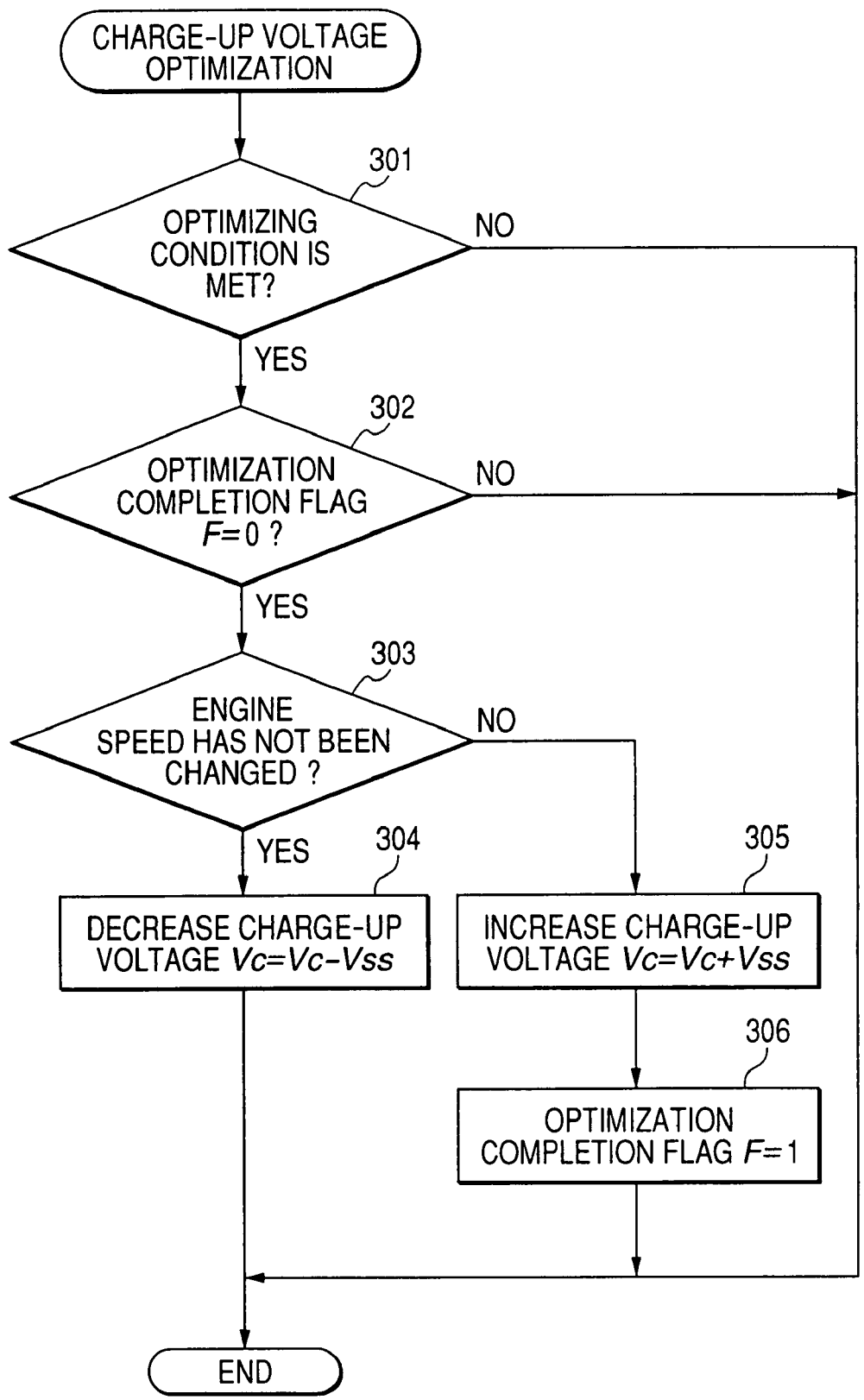
FIG. 7 is a flowchart of a charge-up voltage optimizing program to optimize charge-up voltage for charging a capacitor installed in an injector drive circuit of a fuel injection control apparatus according to the second embodiment of the invention.

FIG. 7 is a flowchart of a charge-up voltage optimizing program to be executed by the ECU 20 at an interval of given crank angle (i.e., upon request of execution of the fuel injection).

After entering the program, the routine proceeds to step 301 wherein charge-up voltage optimizing conditions are met or not. Specifically, it is determined whether the number of injection events has been increased or not. If so, a YES answer is obtained. The routine then proceeds to step 302. If a NO answer is obtained, then the routine terminates.

In step 302, it is determined whether the charge-up optimization has not yet been completed or not. This determination is made using an optimization completion flag F which is set zero (0) when the charge-up optimization has not yet been completed and one (1) when it has been completed. The optimization completion flag F is initialized to zero (0) upon turning on of the ECU 20 and also set to zero (0) each time one of the engine operating ranges B, C, D, and E is changed to another one. If a YES answer is obtained meaning that the charge-up optimization has not yet been completed, then the routine proceeds to step 303.

In step 303, it is determined, like step 107 in FIG. 4, whether the speed of the engine 10 has not undergone an undesirable change arising from execution of the latest sequence of multiple injections or not. When the charge-up voltage drops greatly, it may result in a failure in actuating each of the injectors 11 according to a selected one of the injection patterns, thus leading to a undesirable variation in instant value of the speed of the engine 10 among the cylinders of the engine 10. In order to avoid such a undesirable engine speed variation, the ECU 20 determines whether the charge-up voltage should be decreased or increased based on a change in speed of the engine 10. Specifically, if the speed of the engine 10 has not changed undesirably, the routine proceeds to step 304 wherein the charge-up voltage is decreased according to a relation of Vc=Vc−Vss where Vc is the current value of the charge-up voltage, and Vss is an amount by which the charge-up voltage should be changed. The routine then terminates. Alternatively, if it is determined in step 303 that the speed of the engine 10 has changed undesirably, the routine proceeds to step 305 wherein the charge-up voltage is increased or returned according to a relation of Vc=Vc+Vss. The routine proceeds to step 306 wherein the optimization completion flag F is set to one (1) and then terminates.

The fuel injection control program, as illustrated in FIG. 4, may be modified as described below.

After the temperature of the injector drive circuit 30 is determined in step 106 to be lower than the injection increasing permissible upper limit, it is determined whether the optimization of the charge-up voltage has been completed or not using the optimization completion flag F. If the charge-up voltage is determined to have been optimized, the routine proceeds to step 107 wherein it is determined whether the speed of the engine 10 has not undergone the undesirable change or not. The routine then proceeds to step 108 or 109 wherein the number of injection events to be executed in a subsequent operating cycle of the engine 10 is increased or decreased. If the charge-up voltage is determined not to have been optimized yet, the routine proceeds directly to step 111 without changing the number of injection events. Step 107 serves to determine whether the fact that the speed of the engine 10 has undergone the undesirable change is caused by an undesirable increase in the number of injection events or not. Step 303 in FIG. 7 serves to determine whether the fact that the speed of the engine 10 has undergone the undesirable change is caused by an undesirable drop in the charge-up voltage or not.

As apparent from the above discussion, the ECU 20 of the second embodiment works to decrease the charge-up voltage within the range which ensures the stability of operating conditions of the engine 10 to minimize the amount of heat, as generated in the injector drive circuit 30, thereby permitting the number of injection events to be increased for reducing the combustion noise of the engine 10.

Each time the engine operating conditions have been changed, that is, one of the engine operating ranges B, C, D, and E is changed to another one, the ECU 20 optimizes the charge-up voltage. The optimum value of the charge-up voltage depends upon the number of injection events, that is, the number of times the capacitor 75 of the valve-opening current supply circuit 31 is to be charged. The operation of the ECU 20 of this embodiment is useful in decreasing the amount of heat generated in the injector drive circuit 30.

The fuel injection control program, as illustrated in FIG. 4, may also be modified as described below.

When the temperature of the injector drive circuit 30 is determined in step 106 to be lower than the injection increasing permissible upper limit, the injection counter is incremented by one (1) in step 108, but however, may be incremented by two or more as a function of the value of the temperature of the injector drive circuit 30 because the lower the temperature, the more the number of injection events is allowed to be increased. When the temperature of the injector drive circuit 30 is not lower than the injection increasing permissible upper limit or the speed of the engine 10 has undergone the undesirable change, the ECU 20 may be prohibited from changing the number of injection events without performing step 108 or 109 or decrement the injection counter value by two or more in step 109.

When it is required to increase the number of injection events, the ECU 20 selects a corresponding one of the injection patterns, but may be designed to recalculate the ratio among the quantities of fuel to be injected in a sequence of injections in each execution of the program of FIG. 4.

In step 106 of the program of FIG. 4, the determination is made whether the temperature of the injector drive circuit 30, as determined in the program of FIG. 6, is lower than the injection increasing permissible upper limit or not for changing the number of injection events, but the ECU 20 may be designed to change the increment by which the number of injection events should be increased based on the heat balance, as determined using the above described heat parameters. For instance, when the amount of heat generated in the injector drive circuit 30 is smaller than that dissipated therefrom, it means that the temperature of the injector drive circuit 30 is now decreasing and permits the number of injection events to be increased.

In the program of FIG. 7, the ECU 20 determines whether the engine 10 is in the range which ensures the stability of operating conditions based on the determination of whether the speed of the engine 10 has not undergone the undesirable change arising from execution of the latest sequence of multiple injections or not, but however, may be designed to monitor an output of a combustion pressure sensor installed in a cylinder of the engine 10 to derive the heat release rate and use it to determine whether the operation of the engine 10 is stable or not for determining whether the injectors 11 have sprayed the fuel correctly or not. This also ensures the accuracy in increasing or decreasing the number of injection events to be executed in a subsequent operating cycle of the engine 10.

When the injection counter value is decremented in step 109 of FIG. 4, so that the number of injection events to be executed in a subsequent operating cycle of the engine 10 becomes smaller than zero (0), the ECU 20 may determine that the engine 10 is not operating properly. This is because the fact that the number of injection events becomes smaller than zero (0) means that each of the fuel injectors 11 will not be opened, so that no injection of fuel into the engine 10 will be achieved according to any of the injection patterns. When such a condition is encountered, the ECU 20 may inform the vehicle operator of the fact that the engine 10 is malfunctioning and initiate a fail-safe fuel injection control.

The ECU 20 of the second embodiment works to set the optimization completion flag F to zero (0) to optimize the charge-up voltage each time one of the engine operating ranges B, C, D, and E is changed to another one, but may be designed to optimize the charge-up voltage only one time upon start-up of the engine 10 or in a given cycle.

The common rail fuel injection system of each of the above embodiments may be equipped with a temperature sensor installed on or near the injector drive circuit 30 to measure the temperature thereof directly. The ECU 20 may use an output of the temperature sensor to determine the temperature of the injector drive circuit 30.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A fuel injection control apparatus for a diesel engine comprising:
    an accumulator in which fuel is stored at a controlled pressure;
    an electrically energized injector working to inject the fuel, as stored in said accumulator, into a diesel engine;
    an injector drive circuit working to control energization of said injector; and
    a controller working to determine a multi-injection mode in which the fuel is to be injected from said injector into the diesel engine in a sequence of multiple injections in an operating cycle of the diesel engine and output an injection signal to said injector drive circuit to perform the multi-injection mode through said injector, said controller determining whether a number of injections to be executed in a subsequent operating cycle of the diesel engine is allowed to be increased or not in a range which ensures stability of operation of the diesel engine based on a temperature of said injector drive circuit, when it is determined that the number of injections is allowed to be increased, said controller increasing the number of injections to be executed in the subsequent operating cycle of the engine.

2. A fuel injection control apparatus as set forth in claim 1, wherein said controller is designed to perform a temperature determining function to determine the temperature of said injector drive circuit.

3. A fuel injection control apparatus as set forth in claim 1, wherein when it is determined that the number of injections is allowed to be increased, said controller determines the number of injections to be executed in the subsequent operating cycle of the engine as a function of the temperature of said injector drive circuit.

4. A fuel injection control apparatus as set forth in claim 1, wherein said controller stores a plurality of multi-injection patterns which define multi-injection modes different from each other in terms of the temperature of said injector drive circuit and selects one of the multi-injection patterns which matches the temperature of said injector drive circuit.

5. A fuel injection control apparatus as set forth in claim 1, wherein when the diesel engine is at least in a range in which the diesel engine is low in speed thereof and load thereon, the number of injections to be executed in the subsequent operating cycle of the diesel engine is allowed to be increased.

6. A fuel injection control apparatus as set forth in claim 1, wherein when it is determined that the number of injections to be executed in the subsequent operating cycle of the diesel engine is not allowed to be increased, said controller works to decrease the number of injections to be executed in the subsequent operating cycle of the diesel engine.

7. A fuel injection control apparatus as set forth in claim 1, wherein after execution of the multi-injection mode, said controller determines whether the diesel engine is in an instable operating condition or not, when it is determined that the diesel engine is in the instable operating condition, said controller decreases or prohibits the number of injections to be executed in the subsequent operating cycle of the diesel engine from being increased.

8. A fuel injection control apparatus as set forth in claim 1, wherein said injector drive circuit includes a valve-opening current supply circuit equipped with a capacitor and a valve position-holding current supply circuit, when it is required to open said injector, the valve-opening current supply circuit working to release electrical energy from the capacitor to supply a valve opening current to said injector, said valve position-holding current supply circuit working to supply a valve position-holding current after supply of the valve opening current to hold said injector at a given valve position, and wherein said controller decreases charge-up voltage for charging the capacitor of said valve-opening current supply circuit within a range which ensures stability of operation of the diesel engine.

9. A fuel injection control apparatus as set forth in claim 2, wherein said controller samples a given heat parameter that is a function of a heat balance in said injector drive circuit and use the heat parameter to determine the temperature of said injector drive circuit.

* * * * *